United States Patent
Snover et al.

(10) Patent No.: US 7,144,475 B2
(45) Date of Patent: Dec. 5, 2006

(54) METHOD OF MAKING A COATED PAPER

(75) Inventors: Jonathan L. Snover, St. Augustine, FL (US); Richard Y. Ryu, Chillicothe, OH (US)

(73) Assignee: Newpage Corporation, Dayton, OH (US)

( * ) Notice: Subject to any disclaimer, the term of this patent is extended or adjusted under 35 U.S.C. 154(b) by 342 days.

(21) Appl. No.: 10/622,619

(22) Filed: Jul. 17, 2003

(65) Prior Publication Data

US 2004/0091737 A1     May 13, 2004

Related U.S. Application Data

(63) Continuation-in-part of application No. 09/711,387, filed on Nov. 14, 2000, now Pat. No. 6,617,362.

(51) Int. Cl.
| | |
|---|---|
| *D21H 19/38* | (2006.01) |
| *D21H 19/46* | (2006.01) |
| *D21H 19/64* | (2006.01) |
| *D21H 19/84* | (2006.01) |

(52) U.S. Cl. .................. 162/135; 162/137; 162/181.1; 162/181.5; 162/164.6; 427/209; 427/326; 427/419.2; 428/689

(58) Field of Classification Search ........ 162/125–128, 162/134–137, 181.1, 181.4, 181.5, 183, 184, 162/204, 207; 428/32.1, 32.21, 32.28, 32.29, 428/32.34, 689, 326–329; 106/287.17; 516/93; 427/190, 196, 201–203, 205, 209, 317, 324–326, 427/343, 361, 380, 382, 391, 395, 411, 419.2

See application file for complete search history.

(56) References Cited

U.S. PATENT DOCUMENTS

| | | | | |
|---|---|---|---|---|
| 3,720,514 | A | * | 3/1973 | Honjo et al. .................. 430/60 |
| 3,804,656 | A | * | 4/1974 | Kaliski et al. ............... 106/487 |
| 4,046,946 | A | * | 9/1977 | Shaw ......................... 428/325 |
| 5,741,584 | A | * | 4/1998 | Imabeppu et al. ....... 428/32.24 |
| 6,096,157 | A | * | 8/2000 | Imabeppu et al. .......... 156/285 |
| 6,576,324 | B1 | * | 6/2003 | Yoshino et al. .......... 428/195.1 |
| 6,670,037 | B1 | * | 12/2003 | Okura et al. ................ 428/402 |

* cited by examiner

*Primary Examiner*—Eric Hug
(74) *Attorney, Agent, or Firm*—Thompson Hine LLP

(57) ABSTRACT

The present invention discloses a paper coated with a new coating formulation. The coating formulation comprises a stable pigment slurry prepared without an acid-based dispersant. The coating formulation may be applied to the paper using a variety of methods: In general, an aqueous cationic pigment slurry is prepared comprising an alumina pigment slurry, a nonionic wetting agent, and a cationic interfacial modifier (dispersant). The aqueous cationic pigment slurry is then added to one or more additional conventional coating ingredients, such as binders, pigments, and additives to form a coating formulation. The coating formulation is then applied to at least one side of a paper and the coating is mechanically treated.

4 Claims, No Drawings

METHOD OF MAKING A COATED PAPER

CROSS RELATED APPLICATIONS

This application is a continuation-in-part of U.S. Ser. No. 09/711,387 filed on Nov. 14, 2000, now U.S. Pat. No. 6,617,362.

FIELD OF THE INVENTION

The invention relates to a coated paper made by applying a coating formulation with stable pigment slurries to the paper.

BACKGROUND OF THE INVENTION

Coating formulations or "colors" used to coat paper or paperboard products are usually applied to at least one side of a paper base stock to improve surface smoothness and to provide uniform ink reception and other generally acceptable printing properties. Typically, such formulations include pigments, binders and other additives such as dispersants, viscosity modifiers, lubricants, and chemicals that modify foaming tendencies, microbial susceptibility, pH or physical characteristics such as; color. Porous pigments, such as alumina, are important components of such coating formulations because they contribute to surface porosity of the paper and ink drainage. The porous pigments also reduce surface irregularities, thus improving paper smoothness. In general, a higher proportion of porous pigment improves the smoothness, porosity and ink-receptivity of the coating. These characteristics are particularly desirable for certain coated paper product used in inkjet printing. A commonly observed drawback, however, is that the particulate nature of the pigment limits the amount that can effectively used in the coating formulation.

The pigment is usually added during make-down of the coating formulation as a dispersion or slurry of finely divided particles, as this mode of addition is more convenient for bulk manufacturing. The use of such dispersions is, however, limited by the amount of pigment that is actually suspended in the dispersing medium at the time that it is added to the coating formulation. Because the pigments are insoluble, the pigment particles will settle out, resulting in a reduced amount of pigment per unit volume in the dispersion and the coating color. As a consequence, it is difficult to control the total solids content in the dispersion itself and in the final coating formulation. Another disadvantage is that the particles may react with certain components of the dispersion and aggregate to form a gel or sol of high viscosity, which may cause an undesirable increase in the viscosity or otherwise affect the rheological properties of the coating color.

Inventive efforts have therefore focused on the preparation of stable dispersions of pigments to be incorporated into coating formulations in a manner that allows maximum compatibility with other components of the coating formulation. Such dispersions have been prepared using an acid-based dispersant as a means of stabilizing the pigment particles in suspension. For example, U.S. Pat. No. 3,935,023 (Derolf) discloses aqueous dispersions of alumina in a hydrochloric acid-containing solution. The dispersions so formed have an alumina content of from about 18–26% weight, based on the total weight of solids, or about 54–66% parts by weight (pbw) of $Al_2O_3$ per pbw of hydrochloric acid, and a specific surface area of pigment, as determined by the Brunauer, Emmett and Teller (BET) method of 150–250 $m^2$/gram. The Derolf patent teaches that in order to achieve dispersions of 18–26% by weight, it is necessary to maintain an $Al_2O_3$ to HCl ratio of 54–65 pbw to 1 pbw of HCl, and that when less than 53 pbw of $Al_2O_3$ per pbw of HCl is used, the shelf life of the resulting product is drastically limited. Accordingly, the acid is a necessary component of Derolf's coating formulations. However, acids are hazardous and corrosive materials and are less effective at dispersing pigments. Moreover, it has been determined experimentally that using acids as the primary dispersion means does not produce slurries with a high level of pigment solids at an desired viscosities.

U.S. Pat. No. 5,518,660 (Wei) describes preparing low-viscosity colloidal dispersions of sub-micrometer alumina particles for use in ceramics manufacture that contain 0.1 to 5% by weight of a semicarbazide hydrochloride acidic compound as a dispersing agent. In this regard, the semicarbazide compound dissociates in water by releasing the HCl ligand, which, in turn acidizes the dispersion to avoid agglomeration and thereby maintaining a low viscosity. The Wei method has the short comings similar to Derolf.

As an alternative, coating formulation have been prepared by incorporating the solid pigment directly into the color formulation. For example, Japanese Patent Abstract No. JP 9314985A2 describes an aqueous coating formulation for inkjet or electrophotographic printing containing alumina hydrate, ethylenediamine-tetraacetic acid sodium as a chelating agent, an imidazolium compound as a cationic component and polyacrylamide. The process described by the patent abstract eliminates the step of dispersing the alumina hydrate and adding it to the coating formulation as a slurry. Direct introduction of a solid pigment during preparation of the coating formulation as reported in this abstract is undesirable, however, because additional steps are then required to homogenize the coating formulation and to maintain the desired Theological properties. These additional steps would increase manufacturing costs. In addition, the coating formulation may still be susceptible to the deterioration observed with respect to many dispersions, such as flocculation and gellation.

Accordingly, a need exists for a method of making and applying a coating formulation to paper wherein the coating has a high pigment solids content.

SUMMARY OF THE INVENTION

The present invention discloses a paper coated with a new coating formulation. The coating formulation comprises a stable pigment slurry prepared without an acid-based dispersant. The coating formulation may be applied to the paper using a variety of methods: In general, an aqueous cationic pigment slurry is prepared comprising an alumina pigment slurry, a nonionic wetting agent, and a cationic interfacial modifier (dispersant). The aqueous cationic pigment slurry is then added to one or more additional conventional coating ingredients, such as binders, pigments, and additives to form a coating formulation. The coating formulation is then applied to at least one side of a paper and the coating is mechanically treated.

DETAILED DESCRIPTION OF THE INVENTION

According to the present invention, a pigment slurry that is suitable for use in manufacturing paper and paperboard coating formulations may be prepared and maintained over relatively long periods without flocculation, gellation or other deterioration. The slurries of the invention may be used in a variety of applications including, but not limited to, paper and paperboard coating formulations. The slurries are formed by dispersing and homogenizing an alumina pigment, a nonionic wetting agent or nonionic polymer and a cationic interfacial modifier in an aqueous medium.

As used herein, the term "alumina pigment" includes particulate aluminum oxides and hydrated aluminum oxides in activated, calcined or fused form. Preferably, the alumina pigment may be selected from the group consisting of fumed alumina, alumina trihydroxide and pseudoboehmite. One or more of the aforementioned compounds may be included as the alumina pigment component in the present invention. A wide range of pigment particle sizes may be used, the chosen particle size being limited only in that the particles should be small enough to facilitate suspension or dispersion in an aqueous medium. In this regard, larger particulate aluminas may, if necessary, be divided, for example by jet-milling, to produce a mean particle size suited to aqueous dispersion. A typical particle size for this purpose is in the range of from about 1 to about 10 microns, preferably from about 0.05 microns to about 3 microns. An example of such a material is a pseudoboehmite manufactured by Alcoa World Chemicals Inc., and subsequently jet-milled to a particle size of about 2.0 microns. As another example, a fumed alumina having an average particle size of about 0.2 micron may be used. While it is desirable that a pigment of a particle size sufficient to permit suspension in the aqueous medium of the invention be used, the physical characteristics of the pigment are not otherwise limited. For example, an alumina pigment having a mean particle diameter of about 2 microns was used to prepare slurries according to the invention, the BET surface area, which is a measure of how finely the pigment is divided, of such a pigment may be as high as about 300 $m^2/g$, typically about 270 $m^2/g$, while its pore volume may be in the range of up to about 0.5 ml/g. The alumina pigment preferably represents from about 35 parts by weight to about 45 parts by weight of the aqueous slurry, based on the total weight of the slurry.

The nonionic wetting agent used in the invention is a non-particulate additive that reduces the length of time otherwise required for wetting out of the alumina pigment in the aqueous medium by eliminating the interfacial separation between the pigment particles and the water molecules in the slurry. Typically, this agent is of a molecular composition including at least one alcohol functionality, and, accordingly, may be selected from mono- or polyhydric alcohols, polyalcohols and polyols. Preferably, the nonionic wetting agent is an acetylenic alcohol such as 3,5-dimethyl-1-hexyne-3-diol, which is commercially available for example, from Air Products and Chemicals, Inc. A nonionic polymer may be included as an alternative to or in combination with the nonionic wetting agent. Such polymers are polar in nature, and function as steric blockers that prevent agglomeration of the pigment particles. Examples of appropriate nonionic polymers include nonionic polyacrylamides, such as polyvinyl pyrrolidone (PVP), and nonionic polyvinyl alcohol (PVA) polymers. The amount of nonionic wetting agent, nonionic polymer or combination thereof to be included in the slurry is from about 0.5% to about 5.0% by weight, preferably from about 2% to about 4% by weight, based on the total weight of the pigment.

The cationic slurry also includes a cationic interfacial modifier. As used herein, the term "cationic interfacial modifier" means a cationic dispersant, which acts as an antinucleation agent, or a cationic surfactant, which lowers the interfacial tension between the pigment particles and the molecules in the dispersing medium, or any combination thereof The cationic interfacial modifier includes, but is not limited to, oligomeric compounds, such as inorganic oligomers, and other organic or inorganic polymeric compounds. While not wishing to be bound by any particular theory of operation, it is postulated that the cationic dispersant or cationic surfactant facilitates stable suspension of the pigment particles in the slurry of the invention by establishing a delocalized positive charge throughout the aqueous medium. The pigment particles are thus electrostatically attracted to and separated by the cationically charged species and, as a result, do not aggregate to form larger particles that flocculate from the medium, or form gels of a viscosity so high as to reduce the spreading ability of any coating containing the pigment. This delocalized cationic charge throughout the dispersing medium, in combination with the functional effects of the other ingredients, such as the wetting effect of the nonionic wetting agent or the steric blocking effect of the nonionic polymer therefore facilitates suspension of the particles in the slurry, and may be responsible for the prolonged stability of the slurry over storage periods of up to one year or more.

Preferably, the cationic dispersant is an inorganic oligomer. One example of such a compound is an aluminum hydroxychloride oligomer sold under the trade name "SYLOJET 200A", which is commercially available from W. R. Grace Inc. The cationic surfactant may be used instead of or in combination with a cationic dispersant. A suitable example of this component is RHODAQUAT T, which is a quaternary ammonium compound having a dispersant and antistatic effect, which is commercially available from Rhone-Poulenc Inc. The amount of either cationic dispersant or cationic surfactant that may be included in the slurry is from about 2% to about 15% by weight, preferably from about 5% to about 10% by weight of the total weight of the cationic slurry. In various embodiments of the invention, a combination of cationic dispersant or cationic surfactant may be included in the slurries. In this regard, the proportions of each of the polymer dispersant or surfactant are selected so as to provide a total amount of cationic interfacial modifier of from about 2% to about 15% by weight, preferably from about 5% to about 10% by weight, as described above.

When the alumina pigment is a fumed alumina, a supplemental dispersant such as lactic acid may optionally be added to the slurry in an amount sufficient to generate a pH of from about 2 to about 6. This reduction in pH is generally accompanied by a reduction in viscosity. This ingredient is not necessary for forming the slurries, however, in the case of fumed alumina, mixing with a cationic dispersant such as aluminum hydroxychloride oligomer as well as lactic acid enhances the dispersion of the cationically charged pigment particles in the suspension. This combination augments the dispersion of the fumed alumina to make a stable slurry having an advantageously high solids content. In this embodiment, a fumed alumina slurry with a solids content of up to about 42% weight may be obtained.

To make the slurries, the alumina pigment, nonionic wetting agent or polymer and the cationic interfacial modifier are combined in water, using any conventional mixing means, and agitated to form a slurry. While the order of combination of these ingredients is not critical, it may be desirable to first combine the pigment with the nonionic wetting agent to more easily disperse it in the aqueous carrier before adding the remaining ingredients. After mixing, the resulting slurries have been observed to have an alumina pigment concentration of up to about 67% by weight of solids. Preferably, the pigment content is in-the range of from about 42% to about 67% by weight. The viscosity of the resulting slurry is usually on the order of less than about 5000 cPs, preferably from about 500 to about 2000 cPs, as determined at 20 rpm using a Brookfield No. 4 spindle at 25° C.

Other additives typically used in paper and paperboard pigment formulations may be added to the pigment slurries of the invention. Such additives include, without limitation, one or more ingredients selected from the group consisting of other pigments, brighteners, defoamers, binders and other conventional slurry additives.

The slurries may be implemented in a wide range of applications where pigments are used. They are particularly suitable for forming pigment-rich coating formulations for paper and paperboard coating applications when combined with other coating components. The amount of slurry used in such coating formulations is that which is effective to provide the maximum amount of alumina pigment in the final coated product. When the slurry is used in a coating formulation, the coating may be applied to at least one surface of a paper or paperboard stock by any conventional means known in the art, for example using a roll, blade, bar or pad coater, and the excess metered off to form a layer of uniform thickness on the surface of the stock. Other coating methods may also be used. For example, the coating may be applied as a metered film or by cast coating. After coating, the layer of coating may then be dried, and the coated stock finished by any conventional means, such as calendaring or other suitable mechanical treatments. As but one example of their application in paper manufacture, the slurries may be used in conjunction with a combination of porous and non-porous pigments that yield excellent print performance on original equipment manufacturers' (OEM) inkjet printers. In this regard, it has been observed that the performance of coatings made with the cationic pigment slurries of the invention demonstrate superior printing performance and hold out of anionic inkjet inks.

The slurries formed according to the invention are particularly compatible with other strongly cationic materials that may be used in coating formulations. Non-limiting examples of such materials include cationic latex emulsions and Poly(DADMAC), which is a cationic quaternary amine.

Moreover, the cationic pigment slurries of the invention are highly stable. As used herein, the term "stable" means that the slurries may be stored after preparation without subsequent mixing or agitation for relatively long periods of up to a year or more, without the occurrence of gelling, flocculation or other undesirable deterioration is eliminated or significantly reduced. This stability may be attributed, in part, to the fact that an acid-based dispersant is not used, and also to the stabilizing effects of the cationic interfacial modifier and the nonionic wetting agent and/or polymer.

The following examples are representative of, but are in no way limiting as to the scope of the invention.

EXAMPLE 1

Particles of pseudoboehmite alumina were jet-milled to a mean particle size of about 2.0 microns, to provide a BET specific surface area of approximately 270 m²/g and a pore volume of about 0.5 ml/g. To about 55 grams of water was added approximately 1.0 gram of SURFYNOL 104, an acetylenic alcohol (Air Products & Chemicals Inc.), and about 3.15 grams of RHODAQUAT T (Rhone Poulenc) as a cationic surfactant, to form an aqueous solution. The milled pigment particles were added to this solution and the mixture agitated for about 10 minutes at a temperature of about 90° F. to form a slurry with a total pigment solids content of about 4% by weight. The slurry was maintained in a stable condition without appreciable settling for a period of about 2 months.

EXAMPLE 2

A slurry of fumed alumina was prepared by combining 42 parts fumed alumina with 8 parts of an aluminum hydroxychloride oligomer (SYLOJET 200 A). The resulting slurry had a total pigment solids content of about 42% by weight.

EXAMPLE 3

A slurry was prepared by mixing 70 parts alumina trihydrate pigment (HYDRALCOAT, Alcoa World Chemicals), 8 parts RHODAQUAT T and 2 parts SURFYNOL. The slurry had a total pigment solids content of about 70% by weight.

It is believed that the present invention includes many other embodiments that may not be herein described in detail, but would nonetheless be appreciated by those skilled in the art from the disclosures made. Accordingly, this disclosure should not be read as being limited only to the foregoing examples or only to the designated preferred embodiments.

The invention claimed is:

1. A method of making a coated paper comprising:
   providing a paper substrate;
   preparing a coating formulation including a cationic slurry comprising an alumina pigment, a wetting agent and a cationic interfacial modifier, wherein said alumina pigment is present at about 35 to about 45 percent by weight of said slurry, said wetting agent is present at about 0.5 to about 5 percent by weight of said slurry and said cationic interfacial modifier is present at about 2 to about 15 percent by weight of said slurry, wherein said cationic slurry has a total solids content of about 42 to about 72 percent by weight; and
   applying said coating formulation to at least one side of said paper substrate at a coat weight of about 2 to about 8 pounds per 3,300 square feet.

2. The method of claim 1 wherein said wetting agent is selected from the group consisting of monohydric alcohols, polyhydric alcohols, polyalcohols, polyols, facetylenic alcohol and combinations thereof.

3. The method of claim 1 wherein said cationic interfacial modifier includes at least one of a cationic dispersants and a cationic surfactants.

4. The method of claim 1 wherein said cationic interfacial modifier includes at least one of an aluminum hydroxychloride, a quaternary ammonium and an inorganic oligomer.

* * * * *